United States Patent [19]

Ferrante et al.

[11] Patent Number: 4,571,340
[45] Date of Patent: Feb. 18, 1986

[54] METHOD OF BAKING PRE-PROOFED FROZEN DOUGH IN AN OVENABLE SELF-OPENING CONTAINER

[75] Inventors: Joseph G. Ferrante, Irvington, N.Y.; Henry J. Victoria, Allendale, N.J.; George Mileos, Riverdale, N.Y.

[73] Assignee: General Foods Corporation, White Plains, N.Y.

[21] Appl. No.: 570,723

[22] Filed: Jan. 13, 1984

[51] Int. Cl.[4] .................. A21D 8/06; B65B 29/08; B65B 25/16; B65D 81/34
[52] U.S. Cl. .................... 426/393; 426/394; 426/523; 426/111; 426/113; 426/128; 229/33; 229/36; 229/DIG. 3
[58] Field of Search ............... 426/111, 113, 128, 393, 426/394, 523, 407, 412

[56] References Cited

U.S. PATENT DOCUMENTS

| | | | |
|---|---|---|---|
| 3,188,215 | 6/1965 | Snow | 426/114 |
| 3,346,399 | 10/1967 | Watson et al. | 426/128 |
| 3,398,041 | 8/1968 | Ferree | 426/114 |
| 3,502,488 | 3/1970 | Bridgford | 426/128 |
| 3,507,668 | 4/1970 | Bridgford | 426/128 |
| 3,531,298 | 9/1970 | Donahue | 426/111 |
| 3,672,916 | 6/1972 | Virnig | 426/113 |
| 3,734,749 | 5/1973 | Bridgford | 426/128 |
| 4,406,911 | 9/1983 | Larson et al. | 426/19 |

Primary Examiner—Steven Weinstein
Attorney, Agent, or Firm—Jonathan B. Schafrann; Thomas R. Savoie; Daniel J. Donovan

[57] ABSTRACT

The present invention provides a self-opening foldedly formed disposable container said container being lined with a heat and oil resistant hydrophobic material to store and prepare a frozen dough product, said product being pre-proofed. The ovenable container is composed of essentially a rectangular shaped box portion and enclosing said box portion is a pair of like-sized adjacently abutting closure panels, said closure panels, the closed container providing elevated humidity in relation to temperature, opening upwardly and outwardly in response to the mechanical force of the rising dough product, exposing the uppermost area of said product to the oven's environment, said exposure resulting in a golden brown appearance.

4 Claims, 4 Drawing Figures

METHOD OF BAKING PRE-PROOFED FROZEN DOUGH IN AN OVENABLE SELF-OPENING CONTAINER

TECHNICAL FIELD

The present invention relates generally to a disposable ovenable baking and storage container for the preparation of dough products, and more particularly to an improved self-opening ovenable disposable container for the preparation and storage of preproofed frozen dough formulations.

Of the many kinds of convenience foods, there is a well recognized omission in providing the consumer with a complete easy to prepare high quality dough-comestible. With the advent of specialty main courses and desserts, there has been a growing need to complete the meal with such accoutrements as easy to prepare yet fresh made dough products. To wit, there has been a steadily growing demand for freezer-to-oven bread products. The desired end is that an inexhaustable supply of quickly preparable fresh bread or rolls may be presented at the dinner table with little preparatory work and bother. Previously available pre-formed dough products have been of basically two types. First, the most familiar variation is that which is refrigerated; a soft dough packaged within an appropriate container for rolls, pastries and even for bread. Second, attempts to offer a truly frozen dough for bread have resulted in doughs which must be thawed and proofed prior to baking. The shelf life and the quality of the end products of frozen dough products has greatly limited the acceptability of such frozen formulations.

Therefore, there has been a longstanding need for a method and for an appropriate apparatus that would not only facilitate the merchandising of a freezer-to-oven frozen bread dough composition, but also a container wherein such a formulation may be baked and served. The container must be inexpensive to produce, and yet withstand the adverse elements encountered within the oven's environment in the baking process.

DISCUSSION OF PRIOR ART

The prior art is essentially devoid of containers which are suitable for storing and preparing preproofed frozen dough compositions, that is for a dough composition which may be taken from the freezer and immediately baked. U.S. Pat. No. 3,734,749, issued to Bridgford discloses an automatically opening frozen-dough box and baking pan. The Bridgford reference discloses an essentially rectangular foldedly formed multiple paneled cardboard box. Within this cardboard box a mass of frozen dough is placed within an aluminum-foiled cavity. The container is then retrieved from frozen storage and opened by the consumer. After thawing at room temperature, the frozen bread dough undergoes proofing and rises above the boundaries of the opened baking package. The dough may then be baked within the opened container. Other containers of similar design are disclosed in: U.S. Pat. No. 3,507,668 issued to Bridgford, U.S. Pat. No. 3,502,488 issued to Bridgford, and U.S. Pat. No. 3,346,399 issuing to Watson et al. Notwithstanding the design of the "self-opening" container, all prior art references disclose containers that merely house frozen dough in the freezer environment. Each container must be removed from the freezer, opened by the consumer and the contents therein allowed to first thaw and then to rise. After the dough has been proofed the container which is in an opened condition may be used as a baking dish to bake the proofed dough product.

SUMMARY OF INVENTION

Accordingly, the present invention provides a method and an apparatus for the storage and preparation of a pre-proofed frozen dough product. The container is designed to withstand freezer-to-oven extremes in temperatures. A pre-proofed frozen dough ingot is disposed within an essentially rectilinearly shaped cardboard container said container possessing an essentially rectangular box-shaped body and a pair of abutting top closure panels that seal said container. The closed container, creates a baking environment capable of generating increased humidity within desired baking temperatures. Upon subjecting the container to the elevated oven temperature, the bread or other dough product begins to rise, forcing the top closure panels upward and outward, thereby exposing the uppermost surface of the bread ingot to the oven's environment. Due to the mechanics inherent herein, the exposed dough attains a desirable brown color which greatly enhances the appearance of the baked product. Although the cooking container is disposable, it provides an ideal automatically adjusting environment for the baking of a bread or other dough product.

DETAILED DESCRIPTION OF PREFERRED EMBODIMENT

Figure 1:
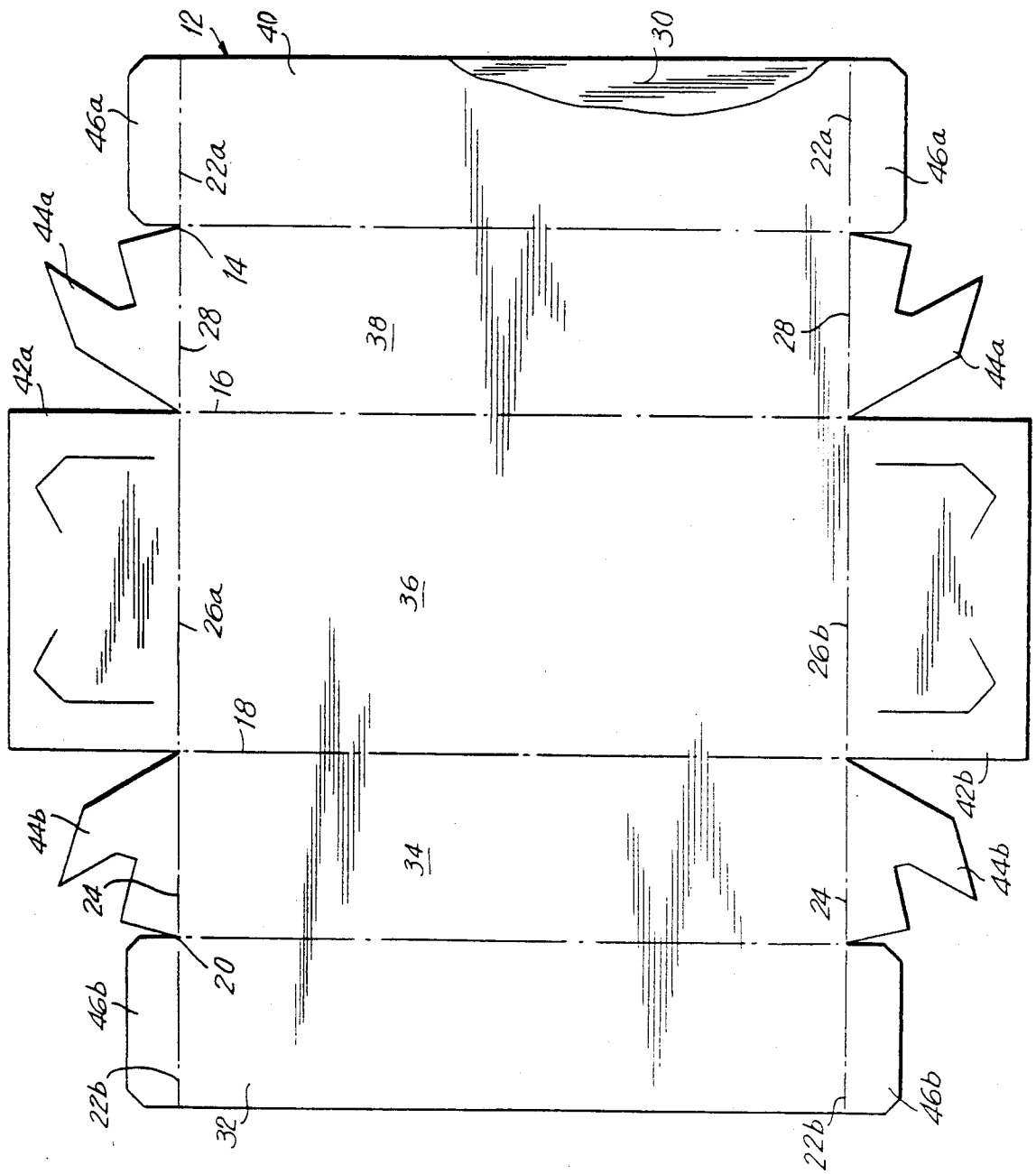
FIG. 1 illustrates a cutaway view of a pre-cut container blank suitable for constructing a container for the storage and preparation of frozen bread dough.
Figure 2:
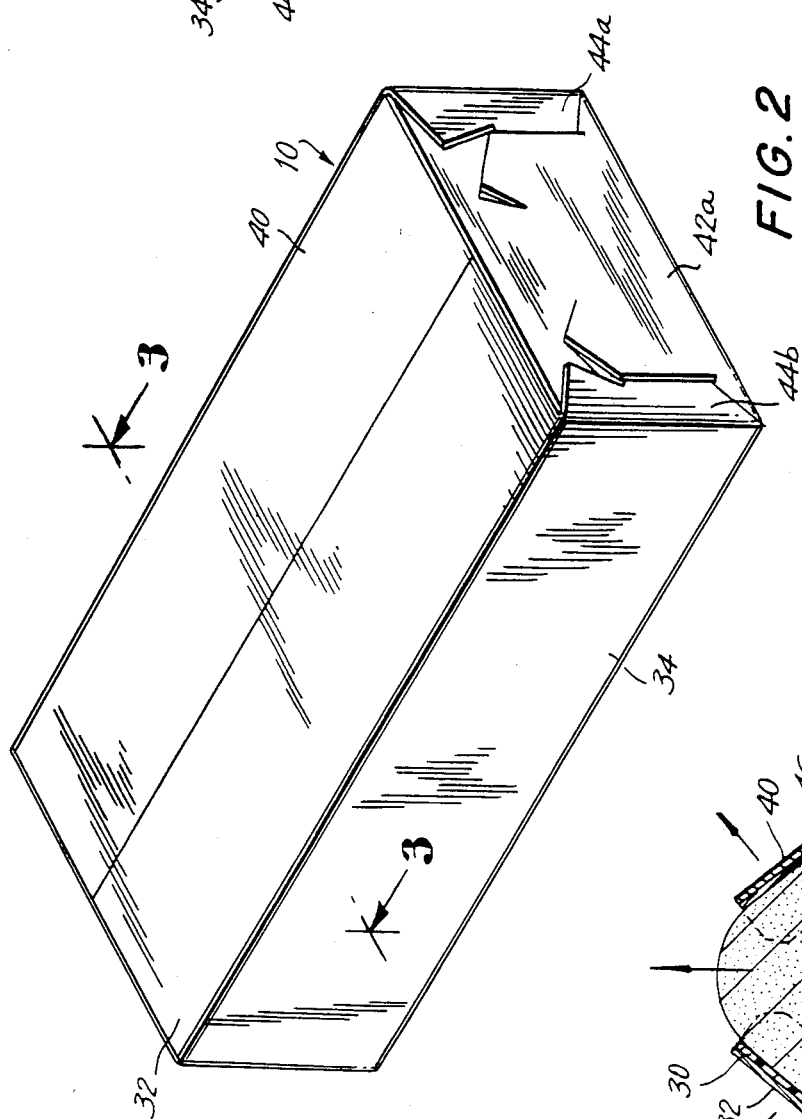
FIG. 2 illustrates a perspective view of the container in a closed condition.

Referring now in more detail, wherein like numerals refer to like parts throughout, FIG. 1 shows blank 12, from which storage and preparation container 10 of FIG. 2 is constructed. To assemble said container as illustrated in FIG. 2, blank 12 of FIG. 1 is foldedly formed, employing the following stepwise procedure.

One takes blank 12 of FIG. 1 and folding along the fold lines enumerated hereinbelow constructs the essentially rectilinearly-shaped container of the present invention; a completed container in a closed condition is illustrated in FIG. 2.

While it is immaterial to the final result, the described procedure for construction shall proceed across the blank, with corresponding panel sections being described together as if the corresponding folds are simultaneous in nature. Folding along lines 14 and 20 top closure panels 32 and 40 are formed thereby. The folds referred to herein may be of scored, folded or of a slitted configurations.

The preferred construction for the above referenced closure panels includes flaps 46a and 46b, said flags retaining closure panels 32 and 40 in a closed position while said flaps are within the body of the container. Flaps 46a and 46b remain therein when the container is stored and during the early baking stages. The dough ingot when contained within the closed container 10 presses against retaining flaps 46a and 46b of closure panels 32 and 40 said panels being of a mirror image relation. Flaps 46a and 46b are designed so as to be integral extensions of flaps 32 and 40, said retaining flaps to be fashioned from the flat blank. Closure panels 32 and 40 are retained in a closed position by flaps 46a–46b and maintain a closed or sealed environment for the dough ingot. This closed environment created therein, prevents the initial escape of moisture during baking, allowing the dough to rise and mechanically push panels 32 and 40 upwward and outward.

Folding along line 16 and 18 gives rise to bottom panel or base member 36 and side panels 34 and 38. Again, folding lines 14 and 20 gives rise to top closure panels 32 and 40. Locking latched side panels 44a and 44b fit within the complimentary slots in panels 42a and 42b which arise as a result of folding along lines 26a and 26b.

FIG. 1 shows a cutaway view of blank 12; an essentially planar, two-ply material is shown. Blank 12 may be fashioned from a variety of materials. Of the many materials, cardboard, paperboard or even a heavy paper may be substituted with full utility intact. The only requirement of the chosen container material is that it withstand the outward force of the dough as it rises to fill the container. Typically, the material will be at least 0.15 inches thick thus preventing deformation of the container in response to the rising and expanding dough.

The liner which will generally referred to by the number 30, represents a hydrophobic heat-resistant material, and as one can already see, covers the total inner surface of container 10. The liner material may be composed of a single material or of a laminate. The material may be fashioned from either polymeric materials, metallic materials or combinations thereof. It is contemplated that the polymeric heat-resistant single or multiple layered materials would be laminated to a cardboard or paperboard blank webbing. Lamination processes are well known, and for purposes of this application would simply include the adhereing of the liner materials to the webbing. Of the various hydrophobic heat-resistant materials, the hydrophobic polymers provide the best material alternatives. Thermoplastic polyesters such as polyethylene terephthalate, polybutylene terephalate and glycol-modified polyesters of the aforementioned polymers are preferred as a liner materials. Many other hydrophobic polymers may be operatively substituted for the above cited materials with basic criteria having: resistant to heat, low vapor transmission, grease resistance, and resistance to temperatures extremes per se. Therefore, suitable materials include polyvinyl chloride, polyvinylidene chloride, polyamide (i.e. Nylon ® a registered trademark owned by Dupont Corp., Wilmington, Del.) and other heat resistant hydrophobic polymers. It should be noted herein that there is in existence ovenable paperboard containers. Said containers withstanding oven temperatures for the preparation of main and side course meals. In the present invention, the hydrophobic polymer which is, heat-resistant/heat-cold resistant, is applied for the above stated reasons, and should be between 0.001 and 0.006 inches in height. It has been found that a layer of polyethylene terephthalate measuring 0.00125 inches is the preferred coating for the above-stated use.

Figure 3:
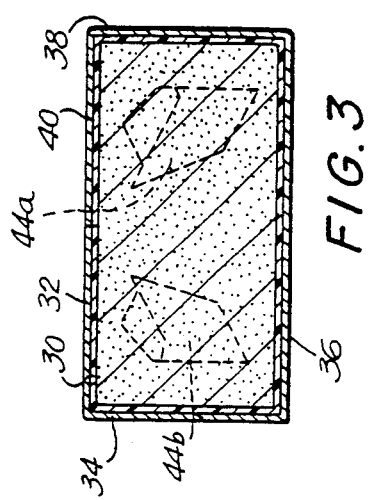
FIG. 3 illustrates a sectional view of the dough disposed within said container taking along lines 3—3 of FIG. 2.

FIG. 3 best illustrates container 10 in a closed condition wherein the dough ingot is sealed so that storage may be effected. The dough ingot fills completely the inner cavity of container 10, said cavity being formed by rigid side walls 34 and 38 and by bottom wall 36. Depicted in dotted lines are the locking flaps 44a and 44b, which are foldedly inserted into corresponding slits adapted to receive said flaps and holding said locking flaps immovable. From this figure the relationship of closure panels 32 and 40 may be viewed. Closure panels 32 and 40 seal container 10, with the edges abutting one another but not over-lapping one another.

Figure 4:
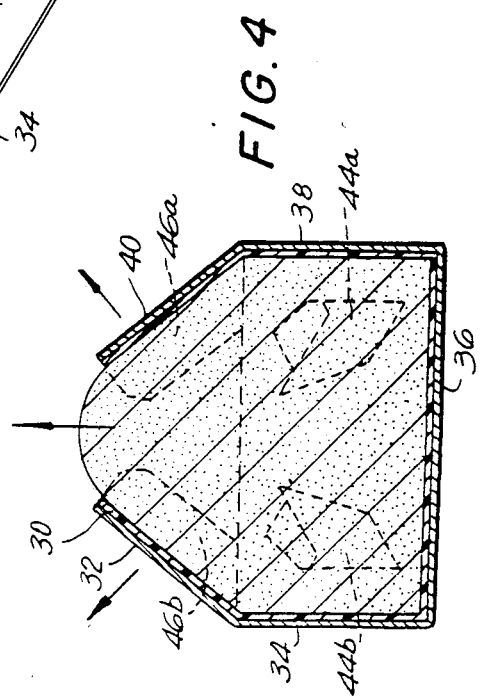
FIG. 4 illustrates the operative kinetics of the dough within the ovenable container of FIG. 3 during the baking cycle.

FIG. 4 illustrates the operative kinetics at work when the frozen bread dough undergoes baking in a suitable oven baking means. As one can see in FIG. 4, the once frozen dough begins to expand at a rate directly proportional to the increase in temperature, said dough seeking the path of least resistance on which to expend its mechanical force. Therefore, as the dough rises upwards panels 40 and 32 are pushed outwardly and upwardly so that the top of the bread loaf is exposed to the inner environment of the oven. Prior to the breakthrough from under closed panels 32 and 40 and the subsequent intimate association of the bread dough with the oven atmosphere, the environment within closed container 10 as illustrated in FIG. 3, provides a retention environment that is capable of generating high humidities thus maintaining the production a moist condition. By varying the thickness of the dough ingot or the amount of endogenous water, one can effectively create an atmosphere of either elevated or lowered humidity. The time necessary for the bread dough to push upwards opening panels 32 and 40 profoundly influences the moisture content selected for the frozen dough ingot. With the present invention humidity levels of about 85% can be maintained while the ingot undergoes baking in the closed container.

To utilize storage and preparation container 10 the following methodology is to be employed. Container 10 as illustrated in FIG. 2, is filled with a pre-proofed, frozen dough ingot, said dough formulation filling essentially the inner cavity of container 10. Container 10 is adapted to withstand temperatures generated within a consumer's oven, and to that end is placed within an oven which may be pre-heated to the desired temperature. The baking period is proportional to the weight and size of the loaf, so that a loaf of reduced dimensions would be baked for a concomitantly shorter period of time. A load resembling the dimensions of a normal one-pound loaf of bread would be baked, using the instant container for 1 hour at 350° F. The container, which has been stored in a freezer-unit, is to be taken from the unit and placd within a pre-heated oven. The only necessary preparatory step is to strip from the sealed container the overwrap, which prevents contamination and dehydration of the contents when the filled container is stored or transported. During the baking period the following mechanical relationship is observed. For the first third of the baking cycle, or approximately 20 minutes, container 10 remains in a closed condition; closure panels 32 and 40 remain in a position folded over and covering the thawing dough ingot. During this period the dough is kept moist since the water within the loaf is prevented from escape. It is imperative that the moisture be retained therein. If the dough were exposed to the oven's elevated temperatures, the ingot would dry out; rising of the dough would then be prevented. Moreover, by retaining elevated amounts of moisture, the finished loaf retains an enhanced moisture content within the loaf and an enhanced golden-brown exterior.

The second third of an hour, or the period approximately between 20 and 40 minutes of the 60 minutes baking period is marked by the opening of closure panels 32 and 40. As the dough ingot begins to rise, a force is exerted upwards which overcomes the normal pressure of the ingot resting against retaining flaps 46a and 46b. Hooks 44a and 44b prevent the opening of the container 10 by supporting end walls 42a and 42b and preventing those walls from deforming under the pressure from the rising and expanding loaf. Since the multiple retaining panels hold the box within the aforementioned configuration, the rising loaf follows the path of least resistance, the path directly upward, thereby causing closure panels 32 and 40 to open. When the closure panels are opened to the widest extent, the baking dough is exposed directly to the oven. Upon exposure to the environment of elevated temperature, the baked loaf acquires a desirable golden brown color.

Therefore, while the present invention is drawn to a frozen bread dough product, other products which require a freezer to oven-proof baking container may be operatively substituted for the present invention and still fall within the scope and spirit of the claims wherein:

We claim:

1. A method for baking a pre-proofed frozen dough product by utilizing a self-opening, rectilinearly-shaped, ovenable storage and preparation container comprising the steps of:
   (a) placing a pre-proofed dough ingot within said container, then overwrapping said container and freeze sttoring the overwrapped container, said container comprising:
      (i) opposing side walls,
      (ii) opposing end walls,
      (iii) a bottom panel,
      (iv) hook-shaped closure flaps which are intergrally formed as extensions of said side walls and which are foldedly inserted into slits in said end walls so that the side and end walls remain immovably upright,
      (v) opposing longitudinally-paralled top closure panels folded downwardly along fold lines located along the top of said paralled side walls so as to form adjacently abutting closure panels which are upwardly and outwardly movable in response to the urging of said dough ingot during baking,
      (vi) foldable flaps located at each end of said top closure panels said flaps being inserted within the body of the container and effective to remain the top closure panels in a closure position during early baking stages,
   (b) thereafter, removing said overwrapped container from freezer storage and removing said overwrapping from said container;
   (c) placing the unwrapped container containing said pre-proofed frozen dough ingot within an oven and heating said oven to a temperature appropriate to effect baking;
   (d) maintaining said temperature so that an elevated humidity is generated within the closed container during an initial period of baking of the dough ingot;
   (e) continuing baking of said dough ingot for a period sufficient to effect rising of the dough so that the dough pushes upwards and urges said abutting, top closure panels upwardly and outward, thereby exposing said dough to the oven's environment and allowing the exposed dough to attain a golden brown appearance; and thereafter,
   (f) removing the baked dough and container from the oven.

2. The method as described in claim 1 wherein the appropriate temperature is within a range of from 200° F. to 375° F.

3. The method as described in claim 1 wherein the temperature is 350° F.

4. The method as described in claim 1 wherein the humidity maintained within the container in the closed condition is at least 85% relative humidity.

* * * * *